(12) United States Patent
Spencer et al.

(10) Patent No.: US 11,685,126 B2
(45) Date of Patent: Jun. 27, 2023

(54) METHOD AND TOOL FOR MOLDING A COMPOSITE PRESSURE VESSEL LINER TO A BOSS

(71) Applicant: Spencer Composites Corporation, Sacramento, CA (US)

(72) Inventors: Brian E. Spencer, Sacramento, CA (US); Zachary B. Spencer, Sacramento, CA (US)

(73) Assignee: Spencer Composites Corporation, Sacramento, CA (US)

( * ) Notice: Subject to any disclaimer, the term of this patent is extended or adjusted under 35 U.S.C. 154(b) by 126 days.

(21) Appl. No.: 17/447,802

(22) Filed: Sep. 15, 2021

(65) Prior Publication Data
US 2022/0016852 A1 Jan. 20, 2022

Related U.S. Application Data

(62) Division of application No. 15/617,923, filed on Jun. 8, 2017, now Pat. No. 11,141,930.
(Continued)

(51) Int. Cl.
*B29C 33/02* (2006.01)
*B29C 33/22* (2006.01)
(Continued)

(52) U.S. Cl.
CPC .............. *B29C 65/70* (2013.01); *B29C 33/02* (2013.01); *B29C 33/22* (2013.01); *B29C 51/12* (2013.01);
(Continued)

(58) Field of Classification Search
CPC ......... B29C 33/02; B29C 33/20; B29C 33/22; B29C 51/008; B29C 51/08; B29C 51/082;
(Continued)

(56) References Cited

U.S. PATENT DOCUMENTS 3,074,585 A 1/1963 Koontz
3,367,815 A * 2/1968 Ragettli ................ B29C 53/824
156/417
(Continued)

FOREIGN PATENT DOCUMENTS

DE 2631449 A1 1/1978
GB 2537828 A 11/2016
(Continued)

*Primary Examiner* — Michael A Tolin
(74) *Attorney, Agent, or Firm* — McCoy Russell LLP

(57) ABSTRACT

A method for molding a composite pressure vessel liner to secure a boss to the liner is described. The method comprises providing a moldable liner having an end section with a neck and a port. A boss is positioned around the neck of the liner and the liner is heated and pressure is applied to mold the liner to form to the shape of the boss. The angle of the molded liner secures the boss in place around the liner and it is able to withstand high pressures. A tool for molding the liner and a method for using the tool is also described. The tool comprises a tool body and a pipe having external threads. The tool body abuts the liner and the boss. Winding the pipe exerts pressure on the liner, which when heated, forces the liner to mold to the shape of the boss.

5 Claims, 4 Drawing Sheets

Related U.S. Application Data

(60) Provisional application No. 62/348,077, filed on Jun. 9, 2016.

(51) Int. Cl.

| | | |
|---|---|---|
| *B29C 51/16* | (2006.01) | |
| *B29C 51/18* | (2006.01) | |
| *B29C 65/02* | (2006.01) | |
| *B29C 65/70* | (2006.01) | |
| *F17C 13/00* | (2006.01) | |
| *B29C 65/00* | (2006.01) | |
| *B29C 57/00* | (2006.01) | |
| *B29C 51/12* | (2006.01) | |
| *B29C 67/00* | (2017.01) | |
| *B29L 31/00* | (2006.01) | |

(52) U.S. Cl.
CPC .............. *B29C 51/16* (2013.01); *B29C 51/18* (2013.01); *B29C 57/005* (2013.01); *B29C 65/02* (2013.01); *B29C 66/5344* (2013.01); *B29C 67/0048* (2013.01); *F17C 13/002* (2013.01); *B29L 2031/712* (2013.01); *B29L 2031/7156* (2013.01); *F17C 2201/0109* (2013.01); *F17C 2203/0604* (2013.01); *F17C 2203/066* (2013.01); *F17C 2209/2109* (2013.01); *F17C 2209/232* (2013.01)

(58) Field of Classification Search
CPC ......... B29C 51/12; B29C 51/16; B29C 51/18; B29C 51/20; B29C 51/428; B29C 53/602; B29C 53/605; B29C 53/82; B29C 53/821; B29C 53/822; B29C 53/824; B29C 57/005; B29C 57/02; B29C 57/04; B29C 63/34; B29C 63/341; B29C 65/02; B29C 65/18; B29C 65/20; B29C 65/70; B29C 66/532; B29C 66/5324; B29C 66/53241; B29C 66/534; B29C 66/5344; B29C 66/5346; B29C 66/53461; B29C 66/53462; B29C 66/71; B29C 66/73921; B29C 67/0048; B29C 70/682; B29C 70/72; B29C 70/76; B29C 70/766; B29C 70/78; B29C 70/84; B29C 70/86; B29L 2031/712; B29L 2031/7156; F17C 1/06; F17C 13/002; F17C 13/06; F17C 2201/0109; F17C 2201/056; F17C 2203/0602; F17C 2203/0604; F17C 2203/066; F17C 2203/0663; F17C 2205/0305; F17C 2209/2109; F17C 2209/232; F17C 2209/234; F17C 2209/236; F17C 2221/011; F17C 2221/012; F17C 2221/014; F17C 2221/033; F17C 2221/035; F17C 2223/0123; F17C 2223/0153; F17C 2223/033; F17C 2223/035; F17C 2223/036; F17C 2260/036

See application file for complete search history.

(56) References Cited

U.S. PATENT DOCUMENTS

| | | |
|---|---|---|
| 3,449,182 A | 6/1969 | Wiltshire |
| 4,290,456 A | 9/1981 | Ahrbeck |
| 5,287,987 A | 2/1994 | Gaiser |
| 5,429,845 A | 7/1995 | Newhouse et al. |
| 5,538,680 A | 7/1996 | Enders |
| 5,568,878 A | 10/1996 | LeBreton |
| 7,731,051 B2 | 6/2010 | Rohwer et al. |
| 8,047,396 B2 | 11/2011 | Jenkins et al. |
| 8,517,206 B2 | 8/2013 | Liu |
| 8,820,570 B2 | 9/2014 | Strack |
| 9,091,395 B2 | 7/2015 | Strack |
| 9,416,918 B2 | 8/2016 | Nettis et al. |
| 10,596,742 B2 | 3/2020 | Fukuyasu et al. |
| 2008/0257604 A1 | 10/2008 | Becker et al. |
| 2015/0338023 A1 | 11/2015 | Coors et al. |
| 2017/0045181 A1 | 2/2017 | Watanabe et al. |
| 2018/0142839 A1 | 5/2018 | Taguchi et al. |
| 2018/0202554 A1 | 7/2018 | Hogan |

FOREIGN PATENT DOCUMENTS

| | | |
|---|---|---|
| JP | 2000179795 A | 6/2000 |
| JP | 2000266288 A | 9/2000 |
| JP | 2017019297 A | 1/2017 |
| KR | 100688066 B1 | 3/2007 |
| WO | 2015162994 A1 | 10/2015 |
| WO | 2016170192 A1 | 10/2016 |

\* cited by examiner

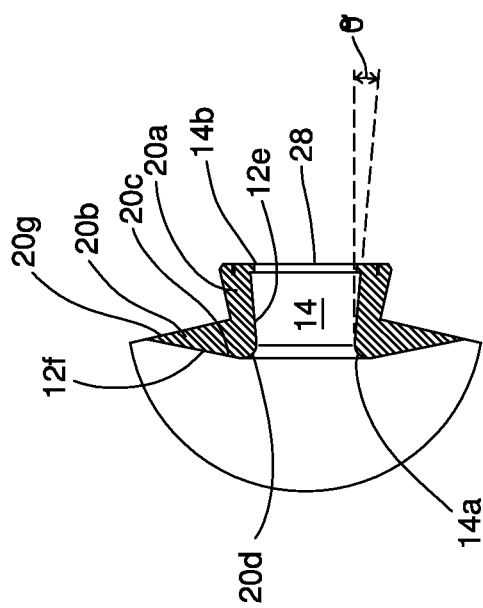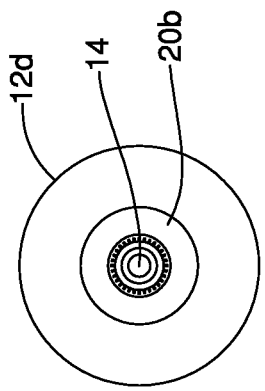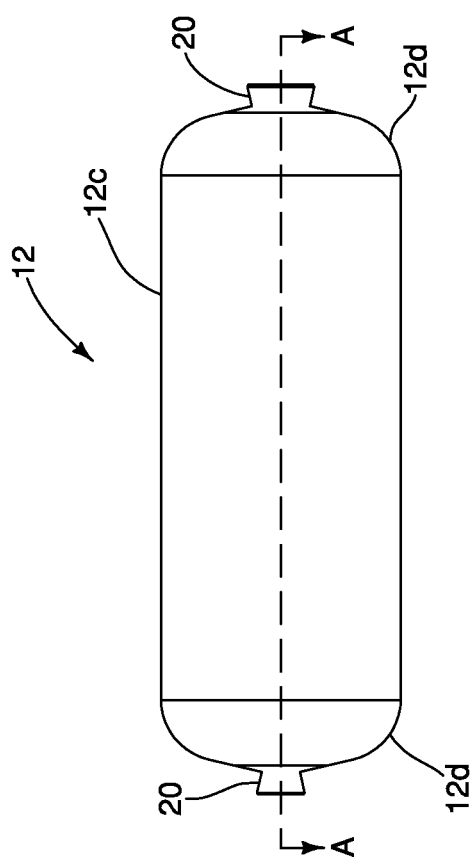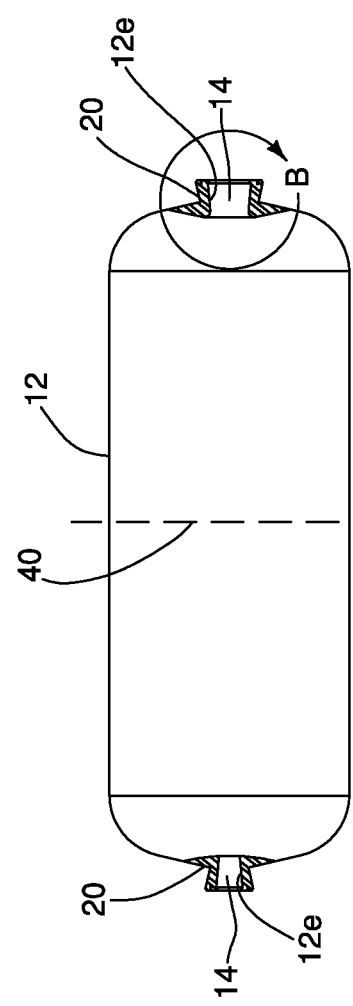

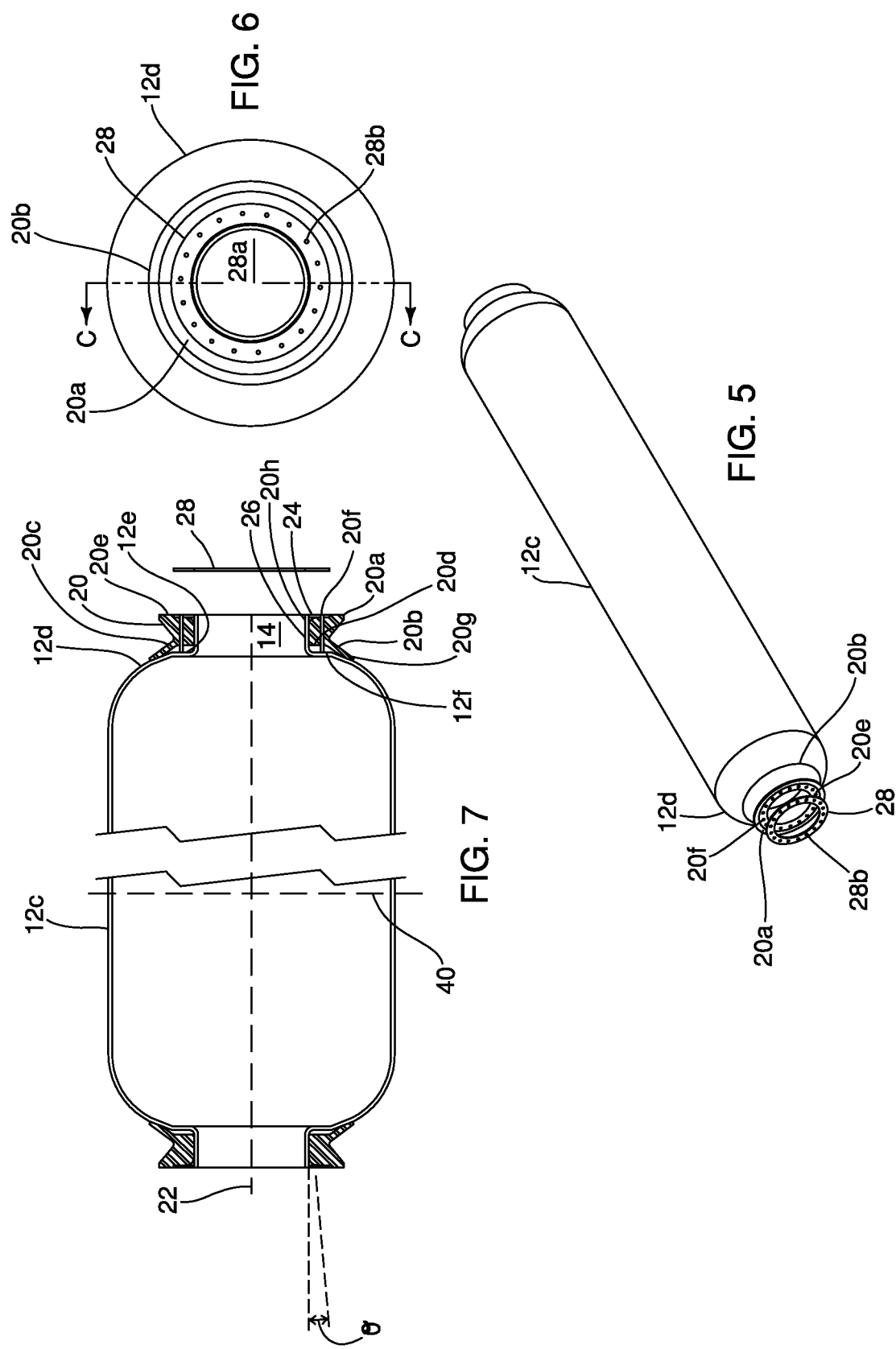

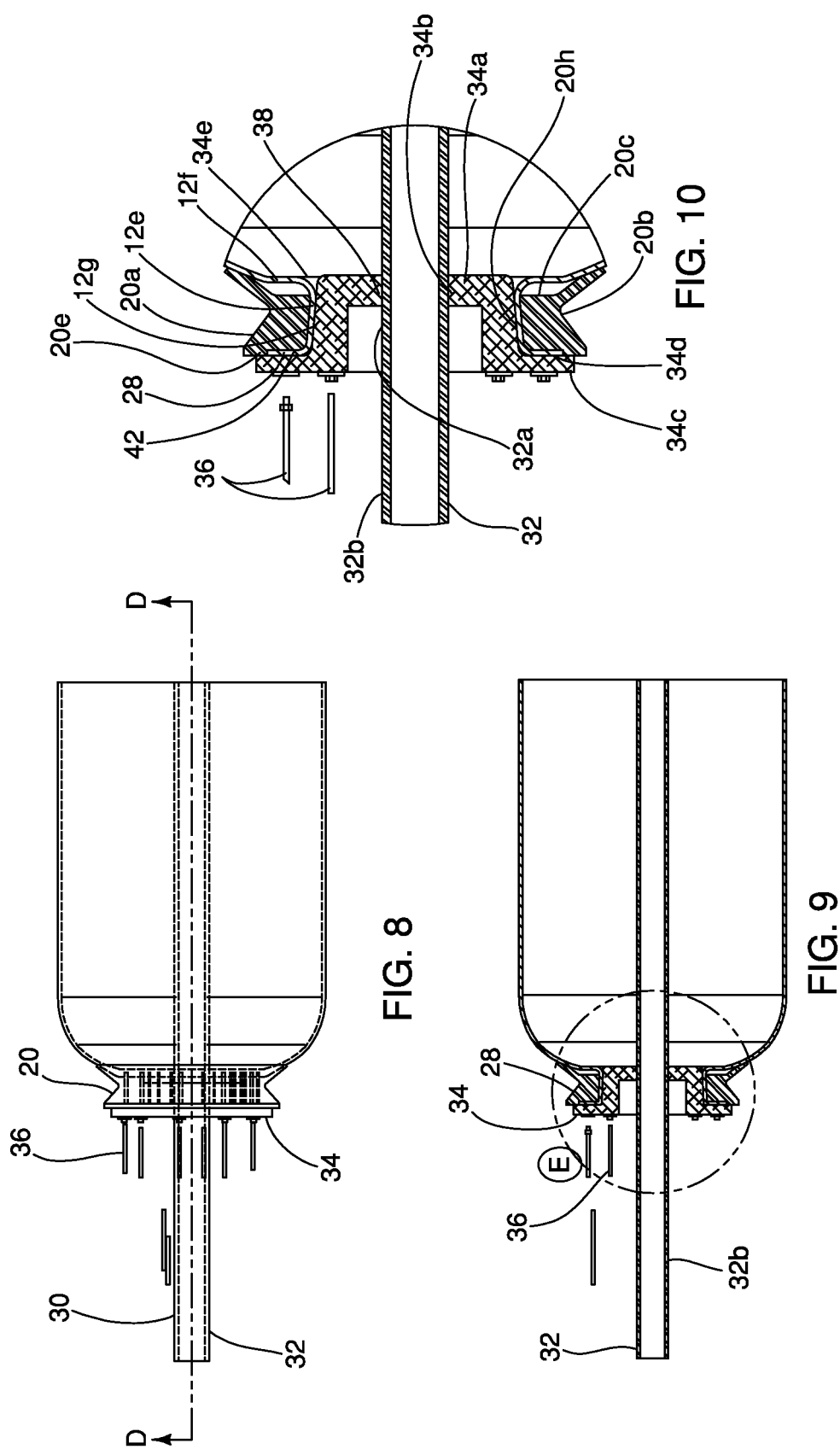

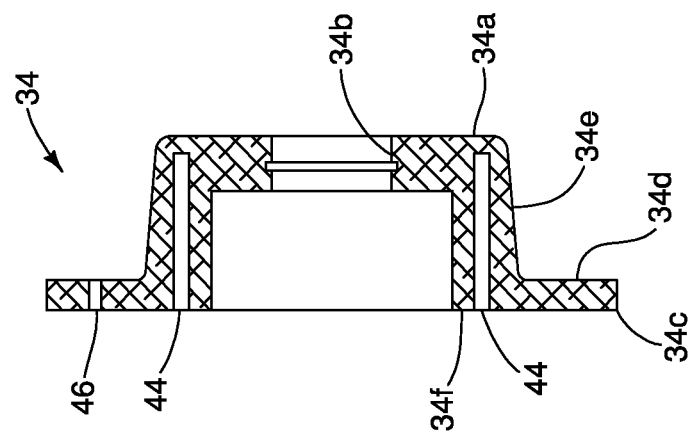
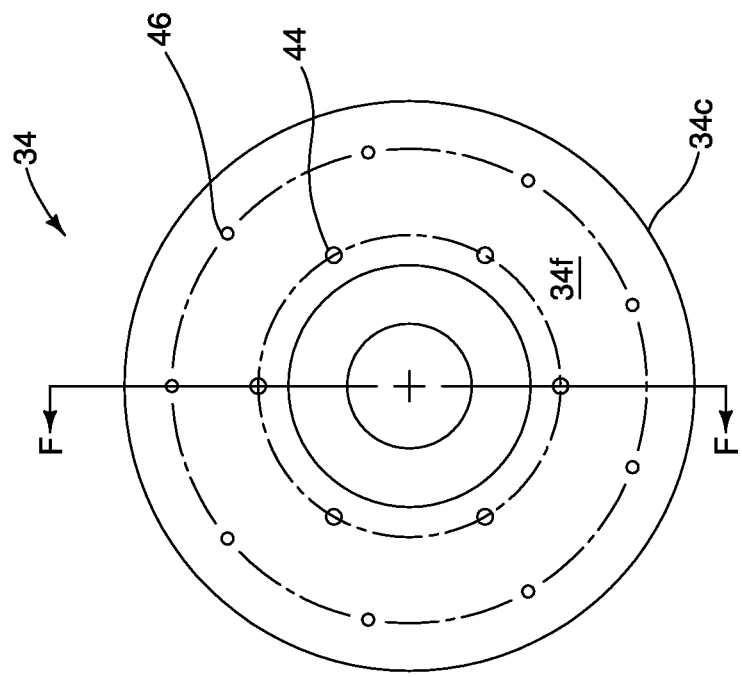
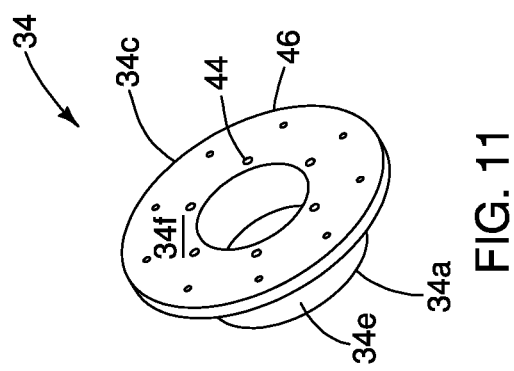

METHOD AND TOOL FOR MOLDING A COMPOSITE PRESSURE VESSEL LINER TO A BOSS

CROSS REFERENCE TO RELATED APPLICATIONS

The present application is a divisional of U.S. Nonprovisional patent application Ser. No. 15/617,923, entitled "METHOD AND TOOL FOR MOLDING A COMPOSITE PRESSURE VESSEL LINER TO A BOSS", and filed on Jun. 8, 2017, now U.S. Pat. No. 11,141,930. U.S. Nonprovisional patent application Ser. No. 15/617,923 claims the priority benefit of U.S. Provisional Patent Application Ser. No. 62/348,077, filed Jun. 9, 2016. The entire contents of each of the above-listed applications are hereby incorporated by reference for all purposes.

TECHNICAL FIELD

The disclosure relates generally to pressure vessels for containing fluids under pressure, and more specifically to molding bosses into the liners of composite pressure vessels.

BACKGROUND

Pressure vessels are commonly used for containing a variety of fluids under pressure, such as oxygen, natural gas, nitrogen, propane and other fuels. Pressure vessels may be made of metal or composite materials. Composite pressure vessels provide several advantages over metallic vessels, including reduced weight and increased resistance to corrosion, fatigue and failure. Typically composite pressure vessels comprise an elastomeric or polymeric liner wrapped with a structural fiber composite and are designed to withstand high pressures, such as 10,000 psi. Often there is a protective shell around the composite for shielding the composite against impact damage. The structural fiber composite is generally a fiber reinforced resin matrix material, such as a filament wound or laminated structure such as fiberglass, carbon fiber or Kevlar™ which provides the vessel strength for holding the fluid under pressure. The liner is located on the interior of the composite and provides an impermeable barrier between the interior of the vessel and the composite, preventing leakage of the fluid stored inside the vessel and chemical degradation of the composite.

Composite pressure vessels may constructed in a variety of shapes and sizes. Most common, pressure vessels have a cylindrical center section with two domed end sections, however other shapes such as spherical, oblate spheroid (near sphere) and toroidal may also be used. A boss at one or both ends provides a fluid communication port between the outside and inside of the vessel for loading and unloading fluid from the vessel. The boss also structurally joins the inner liner to the outer composite shell in a way that prevents fluid from entering the space between the liner and shell. The boss is generally made of metal and comprises a circular flange or support member at the base of a neck that protrudes axially outwardly from the end of the vessel. The flange/support member is attached to the internal liner. A port is defined along the central axis of the neck and the flange/support member for fluid communication between the interior and exterior of the pressure vessel.

In prior art composite pressure vessels, there are various methods for attaching the boss to the liner. Constructing the liner in multiple pieces, including a cylindrical body piece and two dome-shaped end pieces. A boss may be molded into each liner dome, and then the liner domes are molded to the cylindrical body piece. In other prior art methods, the boss may be bonded to the exterior surface of the liner. With another method that is generally only used in low pressure applications, there may be threads molded to the external surface of the liner at its opening and the boss may be screwed onto the threads.

The interface of the boss, the liner and the composite shell can be subjected to very high pressure from the pressurized fluid within the vessel. This pressure can cause problems at the interface, and may cause detachment of the boss from the liner in one or more areas which reduces the structural integrity of the vessel. This may also expose the composite shell or the surfaces between the inner liner and composite shell to the fluid contents, may contribute to separation of the shells, and/or may result in leakage from the pressure vessel. It is therefore important the boss be securely fastened to the liner to reduce the risk of such problems.

It is therefore desirable to be able to securely fasten a boss to a liner in a way that prevents separation or leakage even under high pressure, and that is also simple and economical to manufacture.

SUMMARY

In accordance with the disclosure, there is provided a method for molding a boss into the end of a composite pressure vessel liner. There is also provided a tool for molding the boss into the end of a composite pressure vessel, and a method for using the tool.

There is provided a method for molding a boss into an end of a liner for a composite pressure vessel comprising the steps of: a) providing a moldable liner having a body and at least one end section, the end section comprising a neck with a port for allowing fluid communication between an interior and exterior of the liner, and an end wall adjacent the neck; b) positioning a boss around the neck of the liner, the boss comprising a flange adjacent the liner end wall, and a neck with an inner surface forming a port having an inner end and an outer end, wherein the neck inner surface forms an outward angle from the inner end to the outer end; and c) applying pressure and heat to the liner end section to mold the liner neck to abut the boss neck inner surface to form the same outward angle; wherein after the liner has cooled, the outward angle of the liner neck secures the boss in place around the liner neck.

In some embodiments, the outward angle is 3 to 10 degrees from a longitudinal axis of the liner.

Between steps b) and c), there may be step b.i) which comprises positioning a moldable disk against an end surface of the boss neck and the liner neck, and wherein in step c), the moldable disk is molded to the liner neck to form a continuous piece with the liner neck. In step b.i), the moldable disk may be secured to the end surface using fastening members.

Prior to step c), the liner neck may be substantially parallel to a longitudinal axis of the liner. Prior to step c), there may a first gap between the liner neck and the boss neck inner surface, and after step c), there is no first gap. Prior to step c), there may be a second gap between the liner end wall and the boss flange inner surface, and after step c), there is no second gap. The boss flange inner surface may have an outward angle or an inward angle.

In step c), the liner end wall molds to the geometry of an inner surface of the boss flange.

The at least one end section of the liner may be dome-shaped.

The liner may be made of a thermoplastic material, such as high-density polyethylene (HPDE). The liner may also be made of nylon, Teflon or polydicyclopentadiene (PDCPD).

There is also provided a tool for molding a boss into an end of a liner for a composite pressure vessel, the liner having a liner neck and the boss having a boss neck, the tool comprising a pipe having external tapered threads; a tool body surrounding a section of the pipe, the tool body having a tool body neck in sealing engagement with the section of the pipe, the tool body neck having an outer surface for contacting the liner neck, the tool body also having a tool body flange projecting radially from the tool body neck for contacting the boss and/or a moldable disc that is in contact with the boss; and the tool also comprising fastening devices for fastening the tool body to the boss; wherein the pipe can be wound with respect to the tool body for applying pressure to the tool body for molding the liner.

The tool body may further comprise at least one heater for heating the liner.

There is also provided a method for molding a boss into an end of a liner for a composite pressure vessel using the tool described above, comprising the steps: a) inserting the pipe into a port of the liner such that the tool body neck contacts the liner neck, and the tool body flange contacts the boss and/or the moldable disc; b) fastening the tool body to the boss; c) heating the liner end; d) winding the pipe towards the liner end to apply pressure to the liner neck to mold the liner neck to the boss to form an outward angle of the liner neck; e) allowing the liner to cool; f) unfastening the tool body from the boss; and g) removing the tool from the liner port; wherein the outward angle of the liner neck holds the boss in place around the liner neck. In step d), the pressure may also mold the liner end wall to form to the geometry of the boss. In step c), the moldable disc may also be heated, and in step d), the pressure molds the disc the liner neck to form a continuous piece.

BRIEF DESCRIPTION OF THE FIGURES

Various objects and features of the disclosure will be apparent from the following description of certain embodiments of the disclosure, as illustrated in the accompanying drawings. The drawings are not necessarily to scale, emphasis instead being placed upon illustrating the principles of various embodiments of the disclosure. Similar reference numerals indicate similar components.

FIG. 1 is a side elevation view of a composite pressure vessel liner having a boss molded into each end of the liner.

FIG. 2 is a cross-sectional view of the composite pressure vessel liner of FIG. 1 taken along line A-A.

FIG. 3 is an enlarged view of area B in FIG. 2 illustrating the boss molded into the composite pressure vessel liner.

FIG. 4 is a front end view of the composite pressure vessel liner and boss of FIG. 1.

FIG. 5 is a side perspective view of a composite pressure vessel liner having a boss inserted into each end of the liner but not yet secured within the liner.

FIG. 6 is a front end view of the composite pressure vessel liner and boss of FIG. 5.

FIG. 7 is a cross-sectional view of the composite pressure vessel liner and bosses of FIGS. 5 and 6, taken along line C-C of FIG. 6, wherein the bosses are inserted into the ends of the liner but not yet secured in place.

FIG. 8 is a partial side elevational view of a composite pressure vessel liner and boss being molded into the liner using a molding tool.

FIG. 9 is a cross-sectional view of the composite pressure vessel liner, boss and molding tool of FIG. 8 taken along line D-D.

FIG. 10 is an enlarged view of area E of FIG. 9.

FIG. 11 is a side perspective view of a tool body of a molding tool with heaters.

FIG. 12 is a front elevational view of the tool body of FIG. 11.

FIG. 13 is a cross-sectional view of the tool body of FIGS. 11 and 12 taken along line F-F.

DETAILED DESCRIPTION

Various aspects of the disclosure will now be described with reference to the figures. For the purposes of illustration, components depicted in the figures are not necessarily drawn to scale. Instead, emphasis is placed on highlighting the various contributions of the components to the functionality of various aspects of the disclosure. A number of possible alternative features are introduced during the course of this description. It is to be understood that, according to the knowledge and judgment of persons skilled in the art, such alternative features may be substituted in various combinations to arrive at different embodiments of the present disclosure.

With reference to the figures, a composite pressure vessel liner and a method for incorporating a boss into a composite pressure vessel liner is described.

FIGS. 1-4 illustrate a composite pressure vessel liner 12 having a boss 20 incorporated into each end of the liner. The liner has a body 12*c* with end sections 12*d*. In the illustrated embodiments, the body is cylindrical shaped and the end sections are dome-shaped, however other suitable shapes may be used. The end sections 12*d* have a neck 12*e* through which a port 14 is defined that allows fluid communication between the interior and exterior of the liner, and an end wall 12*f* adjacent the neck 12*e*. The liner can be made of a moldable polymer material and may be rotomolded in one piece. The liner may be a thermoplastic such as high-density polyethylene (HPDE). Other suitable liner materials include but are not limited to nylon, Teflon, and polydicyclopentadiene (PDCPD).

As can best be seen in FIG. 3, the boss 20 has a neck 20*a* and a flange 20*b*, the flange extending radially from the neck 20*a*. The boss neck 20*a* has an inner surface 20*h* that abuts the liner neck 12*e*. The boss flange 20*b* has an inner surface 20*c* that abuts the liner end wall 12*f*. The boss neck 20*a* and liner neck 12*e* angle outwardly from an inner end 14*a* to an outer end 14*b* of the port 14, shown by angle θ in FIG. 3. In some embodiments, the angle is 3 to 10 degrees, however it may be any number greater than zero that allows the boss 20 to be held in place against the liner and still have an opening for the port 14. The diameter of the boss and the pressure vessel will influence what the outward angle may be.

Referring to FIG. 3, the liner end wall 12*f* abuts against the boss flange inner surface 20*c* and has the same geometry as the boss flange inner surface. This geometry depends on the geometry of the pressure vessel and is calculated based on the optimal geometry for eliminating any abrupt contour changes in the pressure vessel which would cause stress concentrations. The boss flange inner surface 20*c* may angle outwardly, as shown in FIG. 3, or it may include an inward angle, as shown in FIG. 7.

To secure the boss 20 to the liner end section 12*d*, the boss is positioned around the liner neck 12*e* and the liner is molded to hold the boss in place. FIGS. 5 to 7 illustrate the boss 20 placed around the liner neck prior to molding. As can be seen in FIG. 7, prior to molding, the angle of the liner neck 12a does not match the outward angle θ of the boss neck inner surface 20h. Instead, the liner neck 12a is generally parallel with a longitudinal axis 22 of the liner which allows the boss neck to be placed around the liner neck. The difference in the angle of the liner neck and boss neck inner surface creates a first gap 24 between the outer end of the boss neck 20a and liner neck 12e. The angle θ of the boss neck inner surface 20h is the desired angle that the liner neck 12e will form after molding is complete. After molding, there will be no first gap 24 since the liner neck 12e will form to the angle of the boss neck inner surface 20h, as shown in FIG. 10.

Prior to molding the liner, the geometry of the liner end wall 12f may not match the geometry of the boss flange inner surface 20c, as shown in FIG. 7. This discrepancy may create a second gap 26 between the boss flange inner surface and the liner end wall. The geometry of the boss flange inner surface 20c is the desired geometry that the liner end wall 12f will form after molding is complete. After molding, there will be no second gap 26 since the liner end wall 12f will form to the geometry of the boss flange inner surface 20c.

As shown in FIGS. 5 to 7, a disc 28 may be placed against an end surface 20e of the boss neck 20a. The disc 28 includes an inner opening 28a that aligns with the port 14. In certain embodiments, the disc can be made of the same material as the liner, i.e. HDPE or another suitable thermoplastic, and can be molded to the liner neck 12e to prevent the boss from rotating or moving axially with respect to the liner while applying the composite material overwrap. Prior to molding, the disc 28 may be secured to the outer surface of the boss neck 20a using fastening members such as screws or pins that extend through holes 28b in the disc and holes 20f in the boss neck, shown in FIGS. 5-7.

During molding, pressure and heat molds the disc 28 to the liner neck 12e, as shown in FIG. 10 where the disc 28 is shown as molded to the liner neck to form one continuous piece with the liner neck. While FIGS. 5 to 7 illustrate the disc 28 being fastened to the liner neck using bolts or screws prior to molding, in FIG. 10 the disc 28 has simply been molded to the liner neck without requiring bolts or screws. The disc may also include lips that hook around the outside of the boss neck 20a (not shown).

Molding Tool

To mold the liner end section 12d, including the liner neck 12e and end wall 12f, to form to the boss 20, a molding tool 30 is used, as illustrated in FIGS. 8-10. In some embodiments, the tool 30 comprises a pipe 32 and a tool body 34 surrounding a section of the pipe. Referring to FIGS. 11-13, the tool body 34 comprises a tool body neck 34a having an internal surface 34b that is sealingly engaged with the pipe 32, and a tool body flange 34c that projects radially from the tool body neck 34a and has an inner surface 34d. As shown in FIGS. 8-10, an outer surface 34e of the tool body neck contacts a liner neck internal surface 12g. The tool body flange inner surface 34d contacts the boss neck end surface 20e and/or the disc 28 if a disc is being used. The angle of the tool body neck outer surface 34e may also correspond to the outward angle θ of the boss neck inner surface 20h.

To sealingly engage the tool body neck 34a to the pipe 32, various sealing mechanisms can be used. The location, type and number of seals may vary. In the embodiment shown in FIG. 10, there are two seals 38 and 42. The first seal 38 is disposed between the outer surface 32a of the pipe and the tool body neck internal surface 34b. The second seal 42 is disposed between the tool flange inner surface 34d and the disc 28, when a disc is being used.

The tool body 34 of the molding tool 30 may also include fastener holes 46 for receiving fastening devices 36, such as bolts or screws, for fastening the tool body 34 to the boss 20.

The tool 30 may include one or more heaters for heating the liner end section 12d and/or disc 28. The heaters may be inserted into the tool body 34. FIGS. 11 to 13 illustrate an end surface 34f of the tool body flange 34c having heating fixture holes 44 for receiving heaters. The heating fixture holes may be positioned in a ring formation as shown in FIG. 12, however other formations may also be used. The tool body flange 34c may also include fastener holes 46 in a ring formation for receiving the fastening devices 36 for attaching the tool body 34 to the boss 20.

The pipe 32 has an outer surface 32a with tapered threads 32b such that the pipe can be wound in either direction with respect to the tool body 34. Winding the pipe towards the tool body exerts pressure on the tool body, which then exerts pressure on the liner 12 and/or disc 28 for molding purposes.

Method for Using the Molding Tool

To use the molding tool to mold the liner 12, the tool pipe 32 is inserted into the port 14 such that the tool body 34 contacts the liner neck 12e and the boss 20, as shown in FIGS. 8 to 10. The tool body 34 is fastened to the boss 20 using the fastening devices 36. The liner end is heated using a heating device, which may be heaters that are located within the tool body, for example cartridge heaters. The tool pipe 32 is wound towards the liner 12, applying inward pressure to the tool body 34 which forces the liner neck 12e to mold to the shape of the boss neck inner surface. This creates the desired outward angle θ of the liner neck as described above. The pressure also causes the liner end wall 12f to mold to the shape of the boss flange inner surface 20c. If a moldable disc 38 is present between the disc neck end surface 20e and the tool body flange inner surface 34d, the heat and pressure will mold the disc to the liner neck 12e such that the disc forms a continuous piece with the liner neck.

After the liner is sufficiently molded, the liner is allowed to cool with the tool in place to set the shape of the liner. After cooling, the tool is removed by unwinding the pipe to release the pressure and detaching the fastening devices 36. The boss is now secure in place around the liner neck 12e and axial movement of the boss with respect to the liner is prevented due to the angle of the liner neck, even when very high pressures are applied to the interface from pressurized fluid stored in the vessel. The liner is then wrapped with a composite material to finish the vessel, as would be known to a person skilled in the art.

Alternatively, to mold the liner, pressure can be applied hydraulically or pneumatically, and automated equipment may be used.

This method for molding the boss to the liner in a composite pressure vessel can be used on a variety of sizes of vessels that can withstand a variety of operating pressures, including high pressures of 10,000 or more psi.

The boss may be made of metal or non-metal materials, including but not limited to alloys of aluminum, steel, nickel or titanium, and composite materials.

The boss and method for attaching the boss to a composite pressure vessel can be used with various shaped composite pressure vessels, including but not limited to spherical, oblate spheroid and toroidal vessels.

Although the present disclosure has been described and illustrated with respect to certain embodiments and uses thereof, it is not to be so limited since modifications and changes can be made therein which are within the full, intended scope of the disclosure as understood by those skilled in the art.

The invention claimed is:

1. A tool for molding and securing a moldable liner to a boss for a composite pressure vessel, the liner having an end section with a liner neck, and the boss having a boss neck, a boss inner surface and a boss end surface, the tool comprising:
   a pipe having external tapered threads;
   a tool body surrounding a section of the pipe, the tool body having:
      a tool body neck in sealing engagement with the section of the pipe, the tool body neck having an outer surface for contacting the liner neck and corresponding to the boss inner surface and the boss end surface; and
      a tool body flange projecting radially from the tool body neck for contacting the boss and/or a moldable disc that is in contact with the boss; and
   fastening devices for fastening the tool body to the boss;
   wherein the pipe can be wound with respect to the tool body for applying pressure to the tool body for molding the liner.

2. The tool of claim 1 wherein the tool body further comprises at least one heater for heating the liner.

3. A method for molding a boss into an end of a moldable liner for a composite pressure vessel using the tool of claim 1 comprising the steps:
   a) inserting the pipe into a port of the liner such that the tool body neck contacts the liner neck, and the tool body flange contacts the boss and/or the moldable disc;
   b) fastening the tool body to the boss;
   c) heating the liner end section;
   d) winding the pipe towards the liner end section to apply pressure to the liner neck to mold the liner neck to the boss to form an outward angle of the liner neck;
   e) allowing the liner to cool;
   f) unfastening the tool body from the boss; and
   g) removing the tool from the liner port;
   wherein the outward angle of the liner neck holds the boss in place around the liner neck.

4. The method of claim 3, wherein in step d), the pressure molds the liner end section to form to the geometry of the boss.

5. The method of claim 3 wherein in step c) the moldable disc is also heated, and in step d), the pressure molds the disc to the liner neck to form a continuous piece.

* * * * *